United States Patent [19]

Li et al.

[11] Patent Number: 5,068,036
[45] Date of Patent: Nov. 26, 1991

[54] ACTIVATED SLUDGE PROCESS WITH IN SITU RECOVERY OF POWDERED ADSORBENT

[75] Inventors: Alan Y. Li, Burr Ridge, Ill.; James F. Grutsch, Hammond, Ind.; Kevin P. O'Leary, Orland Hills, Ill.

[73] Assignee: Chemical Waste Management, Inc., Oak Brook, Ill.

[21] Appl. No.: 502,290

[22] Filed: Mar. 30, 1990

Related U.S. Application Data

[63] Continuation-in-part of Ser. No. 291,061, Dec. 28, 1988, abandoned.

[51] Int. Cl.$^5$ .............................. C02F 3/00; C02F 3/08
[52] U.S. Cl. .................................. 210/606; 210/607; 210/616; 210/625; 210/764
[58] Field of Search ............... 210/606, 607, 616, 618, 210/625, 631, 670, 712, 748, 764, 912; 502/5, 25, 27

[56] References Cited

U.S. PATENT DOCUMENTS

| | | | |
|---|---|---|---|
| 3,300,402 | 1/1967 | Grich et al. | 210/625 |
| 3,622,507 | 11/1971 | Pasveer | 210/625 |
| 3,794,581 | 2/1974 | Zuckerman et al. | 210/631 |
| 3,801,499 | 4/1974 | Luck | 210/606 |
| 3,803,029 | 4/1974 | Blechrczyk | 210/630 |
| 3,806,448 | 4/1974 | Smith et al. | 210/625 |
| 3,915,853 | 10/1975 | Luck | 210/606 |
| 3,951,491 | 7/1971 | Smith et al. | 210/625 |
| 3,965,037 | 6/1976 | Kennedy | 210/670 |
| 4,073,722 | 2/1978 | Grutsch et al. | 210/631 |
| 4,102,707 | 7/1978 | Lange | 210/764 |
| 4,119,495 | 10/1978 | Belyaev et al. | 210/631 |
| 4,159,944 | 7/1979 | Erickson et al. | 210/631 |
| 4,267,049 | 5/1981 | Erickson et al. | 210/606 |
| 4,277,342 | 7/1981 | Hayes et al. | 210/912 |
| 4,292,176 | 9/1981 | Grutsch et al. | 210/631 |
| 4,328,105 | 5/1982 | Arbuckle | 210/663 |
| 4,377,486 | 3/1983 | Barrick et al. | 210/712 |
| 4,407,717 | 10/1983 | Teletzke et al. | 210/617 |
| 4,626,354 | 12/1986 | Hoffman et al. | 210/631 |

FOREIGN PATENT DOCUMENTS

| | | |
|---|---|---|
| 2094336 | 1/1972 | France . |
| 49-11813 | 3/1974 | Japan . |
| 51-57955 | 5/1976 | Japan . |
| 54-109245 | 8/1979 | Japan . |
| 59-80392 | 5/1984 | Japan . |

*Primary Examiner*—Stanley S. Silverman
*Assistant Examiner*—Christopher Upton
*Attorney, Agent, or Firm*—Allegretti & Witcoff, Ltd.

[57] ABSTRACT

An improved powdered adsorbent enhanced sludge process for the treatment of wastewater is disclosed that allows for in situ recovery of unregenerated powdered adsorbent. In situ recovery is performed by contacting a mixture of activated sludge and spent powdered adsorbent at disassociation conditions whereby cell lysis occurs. The cell lysis allows for physical separation of the spent powdered adsorbent from the activated sludge, thus allowing for recycle of adsorbent without the need for a regeneration process.

24 Claims, 1 Drawing Sheet

ACTIVATED SLUDGE PROCESS WITH IN SITU RECOVERY OF POWDERED ADSORBENT

CROSS-REFERENCE TO RELATED APPLICATION

This application is a continuation-in-part of copending application Ser. No. 291,061 filed Dec. 28, 1988, now abandoned, the contents of which are incorporated herein by reference thereto.

BACKGROUND OF THE INVENTION

1. Field of the Invention

This invention relates to the treatment of contaminated waste streams, more particularly to municipal or industrial wastewaters. This invention is especially useful in the biological processing of contaminated wastewaters.

The treatment of contaminated waste streams from municipal or industrial sources involves a sequence of processing steps for maximizing the purification of the waste stream at minimum cost. Generally, biological treatment processes involve sequential processing steps to decontaminate waste streams. One such process involves the biological treatment of dissolved organics and ammonia in water. One of the most common biological treatment processes employed is the activated sludge process.

The activated sludge process is a conventional wastewater treating process which can produce the highest degree of biological treatment in reasonably compact facilities at the present time. Two stages of treatment are generally used in the activated sludge process. In the first stage, a contaminated waste stream is contacted with activated sludge, which comprises microorganisms and, if desired, a powdered adsorbent medium. The most commonly used adsorbent medium is activated carbon. The microorganisms feed on the contaminants in the waste stream and metabolize these contaminants to form cellular structures and intermediate products. After decontamination is completed, the decontaminated stream and activated sludge are transported to a clairifier where the sludge particles and any adsorbent medium present are separated by gravity from the decontaminated stream. Typically, a portion of the sludge and carbon is recycled back to the first stage for contact with the incoming contaminated waste stream. Unfortunately, gravity separation does not facilitate separation of the activated sludge from the surface of the absorbent medium adsorbent. The remainder of the sludge and adsorbent medium can be further processed to remove excess water and to thicken the sludge-adsorbent mixture. The thickened sludge is permitted to digest, that is, the microorganisms feed upon their own cellular structures. The digestion step stabilizes the microorganisms. U.S. Patent No. 4,073,722 teaches dewatering, thickening, and digestion of activated sludge and powdered activated carbon mixtures.

A variety of powdered adsorbent materials are used in biological treatment systems. Powdered activated carbon is the material most commonly used in biological treatment processes. Although it is known that powdered adsorbent materials enhance the performance of activated sludge processes, the exact mechanism is still not clear. Activated carbon enhancement appears to include the mechanisms of improved buffering, increased biological surface area, decreased sensitivity to toxic substances, improved phase separation, and adsorption. Only the last mechanism requires regeneration of activated carbon for reuse. Adsorption is most important when the system is operated at low solids retention times (SRT). As the SRT of operation increases, the role of adsorption decreases and the other mechanisms dominate. Even at low SRT, when adsorption is important, the recovery the reuse of nonregenerated carbon improves operation. The art has not recognized that it is feasible to achieve enhanced performance by recycling wasted or spent carbon that has been recovered by means other than by conventional regeneration. Practicing a once through operation without reclaiming and recycling carbon is costly and presents significant disposal problems.

Conventionally, thermal regeneration has been the solution to avoiding disposal of spent activated carbon. One thermal method proposed for regenerating powdered activated carbon involves the wet oxidation of mixture of biological solids (biomass) and spent powdered carbon. Another is controlled flame incineration. Wet oxidation at elevated temperatures and pressures destroys the volatile portion of the biological solids and oxidizes the organic substances adsorbed on the surface of the powdered carbon to restore the carbon's adsorptive capacity. The resultant regenerated powdered carbon is recycled as part of an aqueous slurry to the treatment process.

There are, however, drawbacks to the wet oxidation regeneration process. These include, among others, the high potential for the destruction of the powdered carbon, the high cost of operation and the dangers associated with the operation of high pressure reactors. The wet oxidation reactor must be carefully controlled to avoid excessive temperatures, high oxygen levels, or extended residence times, which all result in loss of the powdered activated carbon. High carbon losses significantly increase the overall cost of the biological treatment system of which it is a part.

The present invention overcomes the problems of prior art regeneration processes and provides an efficient and economic biological treatment process that employs a combination of two innovative unit operations. The first of these is the concept of reusing or recycling a spent powdered adsorbent medium that has not undergone regeneration. The second operation is a unique recovery process whereby the spent powdered adsorbent medium is recovered from a mixture of activated sludge and spent adsorbent medium through a nondestructive disassociation procedure that utilizes the process of cell lysis.

2. Information Disclosure Statement

Process for biological treatment of waste streams are well known in the art, especially those that employ activated sludge. Also the use of powdered adsorptive materials to enhance the effects of activated sludge is well known. Powdered activated carbon is the most commonly used of the adsorptive materials available and can be used in conjunction with aerobic, anaerobic, or anoxic microorganism containing processes.

The treatment of municipal or industrial wastewaters is disclosed in U.S. Pat. No. 4,292,176 (Grutsch et al.) wherein powdered activated carbon is used to enhance a multistage biological treatment process. In addition to the wet oxidation process for regeneration of powdered activated carbon, the art recognizes other regeneration processes such as biological oxidation, anaerobic digestion, and furnance treatment. For example, U.S. Pat.

No. 4,407,717 (Geletzke et al.) teaches a process for treating wastewaters with a powdered adsorbent in a biological packed tower or trickling filters. This reference also teaches that a portion of spent adsorbent containing solids may be regenerated through either thermal or biological treatment processes. Regeneration through biological treatment requires up to 30 to 60 days to complete a regeneration cycle. The Geletzke reference does not teach the recovery of powdered adsorbent using cell lysis.

An example of such a biological regeneration process is described in U.S. Pat. No. 3,803,029 (Blecharczyk), which provides a process for generating or reactivating a particulate adsorbent contained in a fixed bed by biologically degrading adsorbed impurities. Regeneration is accomplished by directing aerated activated sludge upwardly into the fixed bed of spent adsorbent. Alternatively, treated liquid waste is separated from a mixture of activated sludge and activated carbon and then the adsorbed contaminants on the carbon are degraded by a regeneration procedure involving aeration of the sludge. In each case the regeneration procedure is carried out until complete digestion of entrained materials is accomplished and the adsorptive potential is fully restored.

Regeneration of powdered adsorbent support mediums is also disclosed in U.S. Pat. No. 4,626,354 (Hoffman et al.) wherein a process for treating high strength biochemical oxygen demand (BOD) containing liquors is taught. In this reference it is taught that spent adsorbent material may be regenerated using controlled atmosphere furnace combustion, wet oxidation, or other processes which will destroy the biomass and regenerate the adsorptive property of the support medium. Hoffman et al. further teaches that less-than-complete regeneration is undesirable because the adsorbent will now be able to adsorb color from the water phase.

Another treatment process is disclosed in U.S. Pat. No. 4,328,105 (Arbuckle) where suspended solids and adsorbable contaminants are removed from an influent liquid. This process is characterized by the use of porous polyurethane particles having particulate adsorbent material within the pores of the polyurethane. Adsorbate loaded adsorbent is regenerated using mechanical agitation and a "clean" regeneration liquid. No biomass is present during the regeneration.

Although the art has understood the need to use adsorptive particulate materials in biological treatment processes, it has failed to provide an activated sludge process that is enhanced by the addition of adsorptive materials and that includes both the reuse of unregenerated adsorbent materials and a novel recovery procedure that utilizes cell lysis and not destructive thermal treatment.

SUMMARY OF THE INVENTION

This invention is directed toward a novel biological treatment process that uses activated sludge for the decontamination of waste streams. More specifically, this invention provides an improved process for the removal of contaminants from wastewater streams using a combination of powdered adsorbent and activated sludge comprising microorganisms. In a preferred embodiment, powdered activated carbon (PAC) is used in conjunction with biomass to treat contaminated wastewater.

It is an object of this invention to provide a biological treatment process that can efficiently and economically decontaminate municipal and industrial waste streams.

Another object of this invention is to provide an activated sludge process that is enhanced with a powdered adsorbent that is recovered and recycled, without regeneration, using a low temperature nondestructive procedure.

Yet another object of this invention is to provide an improved PAC enhanced activated sludge process that significantly reduces sludge disposal costs.

Still another object of this invention is to provide a PAC enhanced activated sludge process with in situ recovery of unregenerated PAC that is applicable to continuous and batch operated biological treatment systems and to all biological processes including aerobic, anaerobic and anoxic.

A further object of this invention is to provide a PAC enhanced activated sludge process with in situ recovery of unregenerated PAC that is applicable to continuous and batch operated biological treament systems and to all biological processes including aerobic, anaerobic and anoxic in which a means is provided to remove potentially biotoxic heavy metals so as to maintain non-biotoxic conditions.

Accordingly, a broad embodiment of this invention is directed to an activated sludge process for the biological treatment of contaminated waste streams comprising, in combination, the steps of:

(a) contacting a contaminated waste stream with unregenerated powdered adsorbent and activated sludge comprising cellular microorganisms for a time sufficient to biologically degrade contaminates in the waste stream, thereby producing a decontaminated waste stream;

(b) separating by gravity the activated sludge and the powdered adsorbent from the decontaminated waste stream;

(c) recovering the powdered adsorbent by lysing at least a portion of the cellular microorganisms in at least a portion of the separated powdered adsorbent and activated sludge to yield recovered adsorbent, activated sludge and cell lysate; and (d) recycling the recovered adsorbent, activated sludge and the cell lysate for recontact with a contaminated waste stream, the recovered adsorbent remaining unregenerated prior to recontact.

These as well as other embodiments of the present invention will become evident from the following, more detailed description of certain preferred embodiments.

BRIEF DESCRIPTION OF THE DRAWINGS

The accompanying drawings illustrate preferred embodiments of the invention.

DETAILED DESCRIPTION OF PREFERRED EMBODIMENTS

Figure 1:
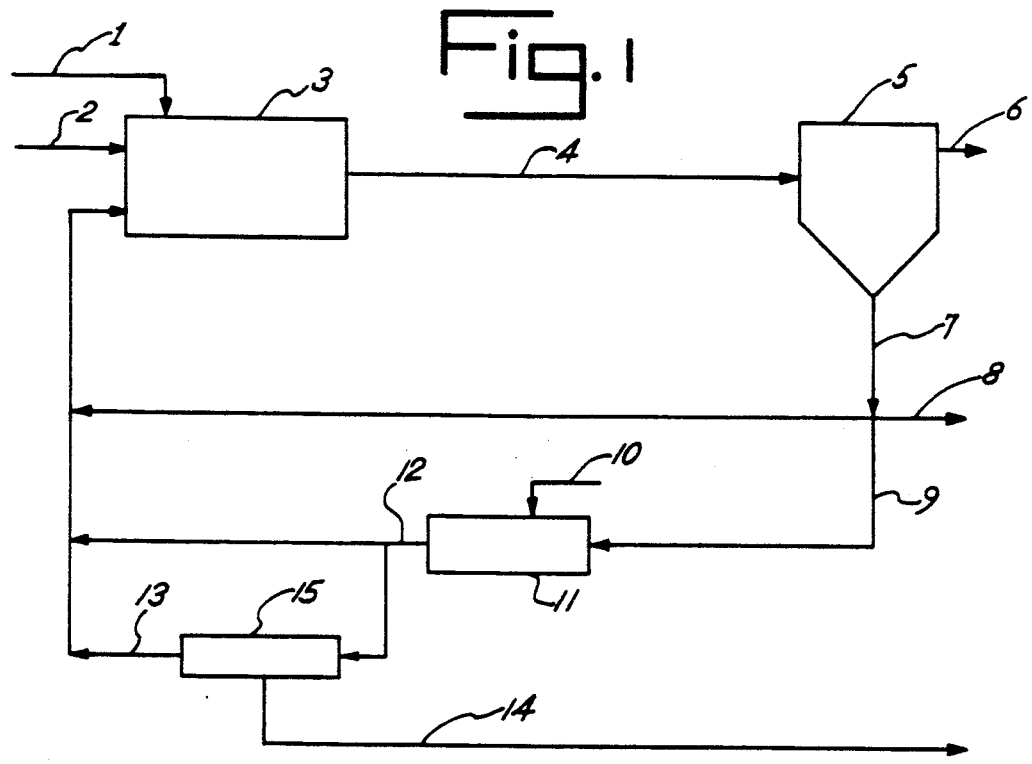
FIG. 1 is a flow diagram of an embodiment of the invention illustrating the biological treatment of a waste stream with a single step recovery and recycle of unregenerated powdered adsorbent using cell lysis.

This invention is a new method for the biological treatment of waste streams. In particular, the instant invention is directed to a novel biological treatment process for the decontamination of waste streams. This process combines the decontamination power of activated sludge and powdered adsorbent with the ability to recover the spent adsorbent in situ (i.e., separate the activated sludge from the adsorbent). Recovery is effected as an integral step of the process by low temperatures cell lysing. This method of recovering the adsorbent eliminates the need for separately subjecting the spent adsorbent and activated sludge mixture to a separate high temperature thermal regeneration. In fact, the recovered adsorbent in the instant process is recycled directly for recontact with the contaminated waste stream without undergoing any form of regeneration. In other words, unregenerated adsorbent, cell lysate and activated sludge are the only materials (except for a minor amount of make-up fresh adsorbent) that are contacted with the incoming waste stream. The instant process is not handicapped by the high cost typically associated with the replacement and/or regeneration of thermally destroyed adsorbent. Applicant's process provides a previously unrecognized economical method to continuously decontaminate waste streams.

. Both high and low strength waste liquors, obtained from either industrial or municipal sources, are suitable for treatment by the inventive method. The most common waste stream available for treatment is wastewater from municipal sources. Treatment of wastewater is performed to remove pollutional factors such as biochemical oxygen demand (BOD), nitrogen, color and toxic substances. Typically the pH of wastewater is from about 4 to about 11 or is treated with chemicals so as to adjust the pH into this range. Commonly the wastewater contains from about 25 to about 15,000 mg/l of total suspended solids.

The biological treatment disclosed in this invention is an activated sludge process (ASP). Any ASP known to the art may be used in our invention. Preferably, the ASP is selected from the group consisting of plug flow, back mix, continuous, sequencing batch, batch, and combinations thereof. The ASP of this invention can utilize a variety of microbes that are well known to the art. Preferred microoganisms are those selected from the group consisting of anaerobic, aerobic, anoxic and mixtures thereof. When aerobic microoganisms are used, the ASP may be defined as the contacting of biological floc (activated sludge) with incoming waste in an aeration tank supplied with sufficient dissolved oxygen (DO) to maintain aerobic conditions, followed by liquid-solid separation in a settling tank (clarifier). To assure an adequate supply of activated sludge with desirable adsorption and settling properties, and capacity to purify incoming wastewater, an appropriate amount of settled sludge is returned to the aeration tank. The ASP can be envisioned as a two-step process. First the removal of organic materials by adsorption/absorption process is rapid, requiring only fifteen to thirty minutes to complete, whereas the conversion step requires a longer period of time. The activated sludge floc is formed by the flocculating properties of bacteria.

In the anaerboic or anoxic process, air or oxygen is not involved in the reaction as in the aerobic process and should be excluded from the process. The anaerobic organisms will convert the organics in the wastewater eventually to methane and carbon dioxide in the absence of oxygen. The anoxic biochemical reactions use inorganic oxygen such as nitrate or sulfate oxygen as opposed to molecular oxygen as the terminal electron acceptor in oxidizing organic compounds. Common anaerobic process include fermentation, sludge digestion, and anaerboic conversion of high strength organics in wastewaters to methane. Typical anoxic processes are denitrifiction, which converts the $NO_3^{-1}$ to $N_2$, and sulfate reduction, which involves the conversation of $SO_4^{-2}$ to $S^{-2}$.

In addition to the activated sludge, this invention uses a powdered adsorbent medium to improve the overall process performance through enhanced organic uptake and improved sludge settling rate. Although the basic mechanisms for the improved performance of an enhanced activated sludge process are still not clear, it is believed that the powdered adsorbent is able to absorb and desorb the organics in the wastewater and thereby dampen any load variations that may occur. Also, the adsorbent provides surface area for bacterial attachment and growth resulting in a high concentration of biomass available for the conversion of the organics in the wastewater. A major disadvantage of sludge process that are enhanced by powdered adsorbents is the cost of the adsorbent medium. Typically, for every pound of biomass an equivalent amount of powdered adsorbent is required.

When the powdered adsorbent and activated sludge are brought into contact, the microorganisms in the activated sludge attach to the powdered adsorbent, grow, and encapsulate the adsorbent particles. This makes physical separation, after the treatment step, of the activated sludge and carbon extremely difficult, if not impossible. Disposal of the activated sludge and adsorbent mixture is not a cost effective solution. As stated, the prior art has recognized this problem and has developed processes that separate the adsorbent from the activated sludge. These processes rely on thermal regeneration techniques, such as wet oxidation and controlled flame incineration. These thermal regeneration techniques are expensive, dangerous to operate and produce significant quantities of ash particles that must eventually be separated from the regenerated adsorbent. More significantly, these thermal regeneration processes destroy a good portion of the adsorbent. Replacement of the quantity of destroyed adsorbent with new adsorbent adds to the overall cost of the entire biological treatment process.

In contradistinction to the prior art biological treatment processes, the present invention does not regenerate the adsorbent medium but instead employs a low temperature nondestructive technique to recover the spent powdered adsorbent. As used herein the term "regeneration" means a treatment or process that removes substantially all of the materials adsorbed on the spent adsorbent such that the regenerated adsorbent has adsorbent properties substantially equal to fresh/new adsorbent. The spent adsorbent in the present invention is recycled in an unregenerated condition, i.e., a substantial portion of the materials adsorbed on the spent adsorbent remains adsorbed thereon such that the spent adsorbent that is recycled in the present invention does not have the adsorbent properties of fresh/new adsorbent.

The powdered adsorbent support medium used in this invention is any material capable of adsorbing dissolved materials from aqueous solutions. The powdered adsorbent used in our invention may be selected from the group consisting of activated carbon, fly ash, polymeric materials, diatomaceous earth, fuller's earth, sand, coal, crystalline aluminosilicates, and mixtures thereof. A preferred powdered adsorbent material comprises powdered activated carbon. Any powdered activated carbon (PAC) known to the art may be used in conjunction with the activated sludge in the inventive process. The preferred particle size of the activated carbon will depend on the density of the carbon selected. The particle size should be small enough such that the mixture of activated sludge and powdered activated carbon can be fluidized. The quantity of powdered adsorbent used in the inventive process will vary depending upon the physical and chemical characteristics of the absorbent chosen. It is preferred that the weight quantity of powdered adsorbent added to the reaction vessel (an aeration vessel when aerobic microbes are present) be equal to the amount of activated sludge present. The quantity of adsorbent added includes both the recovered spent adsorbent and any fresh/new adsorbent that may be added from time to time. It is also preferred that the powdered adsorbent be added directly to the reaction or aeration vessel. However, any convenient point of addition, such as in the recycle line, may be used.

Referring now to FIG. 1 of the drawings, which shows the steps involved in one preferred embodiment of this invention, the waste stream comprises wastewater 1, preferably having undergone primary treatment to remove gross amounts of oil, grease, and solids before it is introduced into aeration vessel 3. If needed, fresh powdered adsorbent 2 is also added. A stream 12 comprising a mixture of recovered powdered adsorbent, activated sludge and cell lysate is also introduced into aeration vessel 3. Aeration vessel 3 is continuously replenished, for example, with a portion of the activated sludge from the mixture of powdered adsorbent and activated sludge 7 from clarifier 5. Alternatively, the bacteria comprising the activated sludge may be provided by inoculation with cultures especially prepared for this purpose. Some of the bacteria may become attached to the powdered adsorbent support, while others remain free floating. The wastewater 1 is continuously mixed and contacted with the activated sludge and powdered adsorbent in aeration vessel 3 for a period of from about 4 to about 168 hours, depending upon the BOD or chemical oxygen demand (COD) concentration in the wastewater and the degree of treatment desired. Mild mixing in aeration vessel 3 is preferably accomplished by introducing compressed air or oxygen containing gases.

After decontamination of the wastewater is completed in aeration vessel 3, a mixture 4 of decontaminated wastewater, activated sludge and spent powdered adsorbent is directed to a dewatering step in clarifier 5, where the suspended solids comprising a mixture of activated sludge and spent powdered adsorbent are separated by gravity from the decontaminated wastewater to form clarified liquor 6 and sludge 7 comprising activated and spent powdered adsorbent. Clarified liquor 6 is discharged to the environment or to a further step of reuse or treatment. For example, it may be desirable to further treat the clarified liquor to remove small quantities of finely divided solids that may be present.

At least a portion 9 of all sludge 7, which comprises activated sludge and spent powdered adsorbent, is continuously or intermittently directed to adsorbent recovery tank 11. The particular method of handling excess sludge 8 depends upon the quantity of sludge to be handled, the cost of fresh powdered adsorbent and the cost of alternate disposal means. The microorganisms adsorbed on or otherwise attached to the spent powdered adsorbent undergo cell lysis in absorbent recovery tank 11. Cell lysis greatly facilitates the physical separation of the spent adsorbent from the activated sludge because the cells comprising the microorganisms are disrupted. This disruption occurs at the interface of the adsorbent surface and the surrounding activated sludge. Cell lysis involves the destruction of microbial cells through disruption and/or dissolution of the cell membrane and/or cell walls of the microorganisms.

Cell lysis may be achieved by any means known to the art, preferably using a process selected from the group consisting of ultrasonic treatment, homogenization, chemical hydrolysis, chemical oxidation/reduction, and combinations thereof. A most preferred means of cell lysis is chemical hydrolysis wherein an aqueous acidic or alkaline solution is introduced into adsorbent recovery tank 11 through line 10. Common alkaline chemicals for pH adjustment such as sodium hydroxide, soda ash, sodium sulfide, potassium hydroxide, etc., can be employed to effect chemical hydrolysis at pH values of 8 or more. Acidic chemicals such as hydrochloric acid, nitric acid, sulfuric acid, phosphoric acid, etc., can be used to hydrolyze cells at pH values of about 5 or less. The cell lysis process that occurs in adsorbent recovery tank 11 occurs at disassociation conditions that comprise a temperature in a range from about 30° C. to about 150° C., most preferably from about 70° C. to about 120° C., a pressure of from about 1 to about 5 atmospheres, most preferably from about 1 to about 2. The time period required for cell lysis is selected so that enough cell lysis occurs such that the spent adsorbent is easily separated from the activated sludge.

The adsorbent is removed from absorbent recovery tank 11 before complete lysis of all the activated sludge occurs. In other words, the disassociation conditions are selected so that the spent adsorbent does not undergo a regeneration treatment to restore it to fresh condition. A preferred time for cell lysis is from about 1 hour to about 10 hours, most preferably from 2 hours to 6 hours. The cell lysis step produces a mixture of recovered powdered adsorbent, activated sludge and cell lysate 12. The cell lysate comprises cell debris and soluble organics that result from the disruption and/or dissolution of the cell membranes or walls of the microorganisms. The cell lysate can be oxidized biologically to carbon dioxide and water in the aeration vessel 3. In other words, the cell lysate provides food for the microorganisms in aeration vessel 3.

Recovered powdered adsorbent, activated sludge and cell lysate 12 is removed from adsorbent recovery tank 11 and recycled to aeration vessel 3. Periodically, adsorbent, activated sludge and cell lysate 12 may be treated in vessel 15 for removal of toxics. The de-toxified mixture is recycled to aeration vessel 3 and the separated toxics removed via line 14. Small amounts of fresh adsorbent material 2 may be added from time to time depending on the amount of excess adsorbent and sludge mixture 8 withdrawn.

Figure 2:
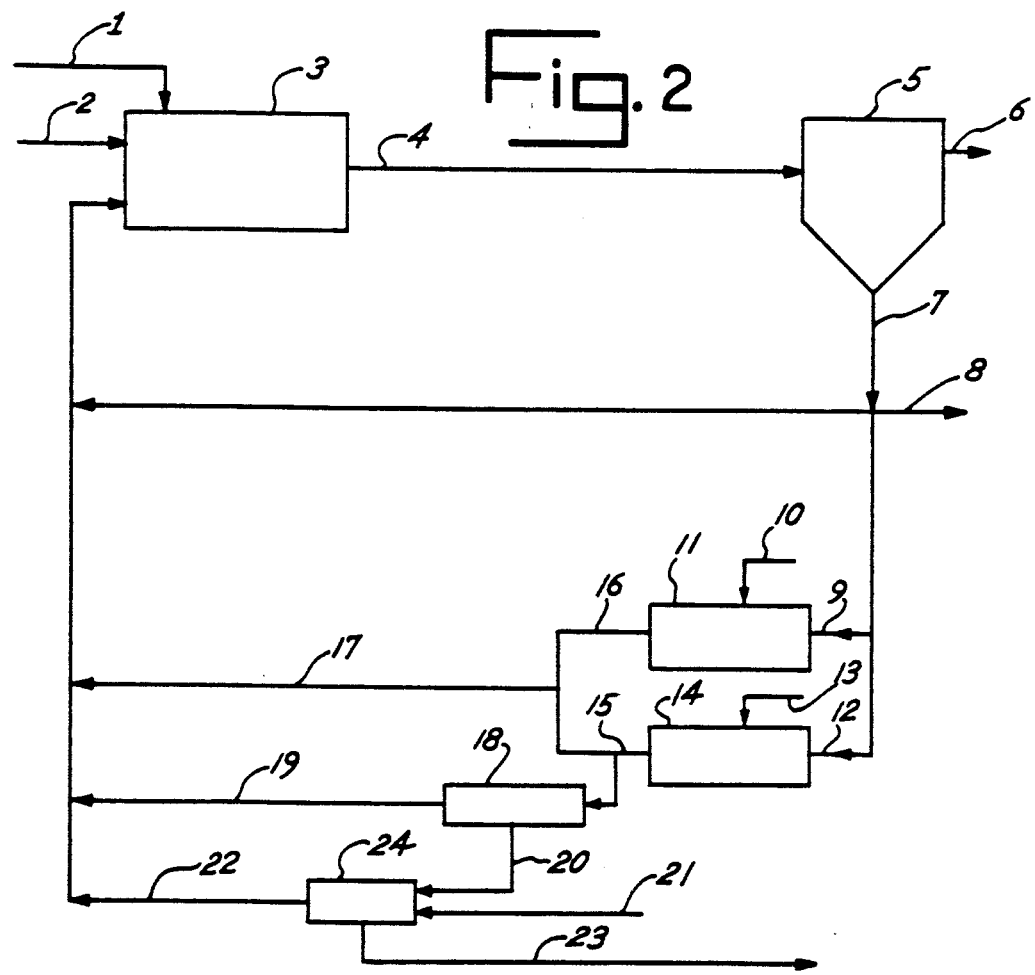
FIG. 2 is a flow diagram of an embodiment of the invention where in situ recovery of unregenerated adsorbent is performed by acid and base induced cell lysis in parallel vessels. Periodically, the acidic cell lysate is treated to remove heavy metals and other substance potentially toxic to biological treatment so that nontoxic conditions are maintained.

Referring now to FIG. 2 of the drawings, the biological treatment process illustrated in FIG. 2 is identical to the process illustrated in FIG. 1 except that the portion of sludge 7 is separated into a first portion 9 and a second portion 12. The first portion 9 is directed to adsorbent recovery tank 11 and the second portion 12 is directed to adsorbent recovery tank 14. The first portion 9 of spent powdered adsorbent and activated sludge is contacted at disassociation conditions with an alkaline aqueous solution 10 in adsorbent recovery tank 11. The spent adsorbent and activated sludge undergo cell lysis to form an admixture of alkaline cell lysate, activated sludge and recovered powdered adsorbent. The second portion 12 of spent powdered adsorbent and activated sludge is contacted at disassociation conditions with an acidic aqueous solution 13 in adsorbent recovery tank 14 wherein cell lysis also occurs. Acidic cell lysate, activated sludge and recovered powdered adsorbent 15 are mixed with the alkaline cell lysate, activated sludge and recovered powdered adsorbent 16 to produce an admixture of recovered powdered adsorbent, activated sludge and cell lysate 17. Admixture 17 is recycled to aeration vessel 3 for contact with waste stream 1 and any fresh powdered adsorbent 2 that may be added from time to time.

Periodically, a portion of the acidic cell lysate may be treated, for example, to reduce the buildup of toxic heavy metals in the system. The acidic cell lysate, activated sludge and recovered adsorbent 15 is filtered 18 and the recovered solids 19 returned to aeration vessel 3 or discarded. Acidic filtrate 20 containing the dissolved heavy metals is made alkaline by contacting filtrate 20 with an aqueous alkaline solution or solid added via line 21 that is readily dissolvable in an aqueous environment. It is preferable that the pH of alkaline filtrate 22 is greater than 9. Addition of the alkaline material via line 21 to the acidic filtrate causes precipitation of the heavy metals, which are filtered 24 and removed from the process via line 23. Alkaline filtrate 22 is returned to aeration vessel 3.

The present invention has been described in terms of certain preferred embodiments. Of course, numerous other embodiments not specifically described may fall within the spirit or scope of the following claims.

We claim as our invention:

1. An activated sludge process for the biological treatment of contaminated waste streams comprising, in combination, the steps of:
   (a) contacting a contaminated waste stream with unregenerated recovered powdered adsorbent having adsorbed/absorbed thereon a substantial quantity of organic material from a previous contact with a contaminated waste stream and activated sludge comprising cellular microorganisms for a time sufficient to biologically degrade contaminates in the waste stream, thereby producing a decontaminated waste stream and a mixture of activated sludge and microorganism encapsulated powdered adsorbent;
   (b) separating by gravity the activated sludge and the microorganism encapsulated powdered adsorbent from the decontaminated waste stream;
   (c) lysing substantially all of the encapsulated powdered adsorbent to remove the microorganisms encapsulating the powdered adsorbent without desorption or destruction of the adsorbed/absorbed organic material to yield unregenerated recovered powdered adsorbent and cell lysate; and
   (d) recycling the unregenerated recovered powdered adsorbent, activated sludge and the cell lysate for recontact with a contaminated waste stream, the unregenerated recovered powdered adsorbent not being subjected to a thermal regeneration process prior to recontact with the contaminated waste stream.

2. The process of claim 1 further comprising that the activated sludge process is selected from the group consisting of plug-flow, back mix, sequencing batch and combinations thereof.

3. The process of claim 1 further comprising that the activated sludge comprises anaerobic cellular microorganisms.

4. The process of claim 1 further comprising that the activated sludge comprises aerobic cellular microorganisms.

5. The process of claim 1 further comprising that the activated sludge comprises anoxic cellular microorganisms.

6. The process of claim 1 further comprising in that the powdered adsorbent is selected from the group consisting of activated carbon, fly ash, polymeric materials, diatomaceous earth, fuller's earth, sand, coal, crystalline aluminosilicates, and mixtures thereof.

7. The process of claim 1 further comprising in that the powdered adsorbent comprises activated carbon.

8. The process of claim 1 further comprising in that the lysing step is carried out using a process selected from the group consisting of ultrasonic treatment, homogenization, chemical hydrolysis, chemical oxidation/reduction, and combinations thereof.

9. The process of claim 1 further comprising in that the lysing step is carried out using a chemical hydrolysis agent selected from the group consisting of acid, alkalies, and mixtures thereof.

10. The process of claim 1 further comprising in that the lysing step is carried out at a temperature in the range from about 30° C. to about 150° C., for a time period of from about 1 hr to about 10 hrs, at a pressure of from about 1 to about 5 atmosphere.

11. The process of claim 1 further comprising in that the lysis step comprising the following substeps of:
   (a) reacting a first portion of separated powdered adsorbent and activated sludge with an acidic aqueous solution;
   (b) reacting a second portion of separated powdered adsorbent and activated sludge with an alkaline aqueous solution; and
   (c) combining the resultant reactant products from substeps (a) and (b) to produce an admixture of recovered powdered adsorbent, activated sludge and cell lysate.

12. The process of claim 11 further comprising by (a') filtering the acidic reactant products, (a'') discarding or recycling the solids, (a''') adjusting the pH of the acidic filtrate to a pH of 9 or higher, (a'''') filtering and (a''''') discarding the solids as a means of controlling accumulation of heavy metals.

13. An activated sludge process for the biological treatment of contaminated waste streams comprising, in combination, the steps of:
   (a) contacting a contaminated waste stream with unregenerated recovered powdered activated carbon having adsorbed/absorbed thereon a substantial quantity of organic material from a previous contact with a contaminated waste stream and activated sludge comprising cellular microorganisms for a time sufficient to biologically degrade contaminates in the waste stream, thereby producing a decontaminated waste stream and a mixture of activated sludge and microorganism encapsulated powdered activated carbon;

(b) separating by gravity the activated sludge and the microorganism encapsulated powdered activated carbon from the decontaminated wastewater;

(c) lysing substantially all of the encapsulated powdered activated carbon to remove the microorganisms encapsulating the powdered activated carbon without desorption or destruction of the adsorbed-/absorbed organic material by the following substeps, i) reacting a first portion of the microorganism encapsulated powdered activated carbon with an acidic aqueous solution;

ii) reacting a second portion of the microorganism encapsulated powdered activated carbon with an alkaline aqueous solution; and iii) combining the resultant reaction products from substeps i) and ii) to produce an admixture of unregenerated recovered powdered activated carbon and cell lysate; and (d) recycling an admixture of unregenerated recovered powdered activated carbon, activated sludge and cell lysate for recontact with contaminated wastewater, the unregenerated recovered powdered activated carbon not being subjected to a thermal regeneration process prior to recontact with the contaminated stream.

14. The process of claim 13 further comprising that the activated sludge process is selected from the group consisting of plug-flow, back mix, sequencing batch and combinations thereof.

15. The process of claim 13 further comprising that the activated sludge comprises anaerobic cellular microorganisms.

16. The process of claim 13 further comprising that the activated sludge comprises aerobic cellular microorganisms.

17. The process of claim 13 further comprising that the activated sludge comprises anoxic cellular microorganisms.

18. The process of claim 13 further comprising in that the lysing step is carried out at a temperature in the range from about 30° C. to about 150° C., for a time period of from about 1 hr to about 10 hrs, at a pressure of from about 1 to about 5 atmosphere.

19. An activated sludge process for the biological treatment of contaminated waste streams comprising, in combination, the steps of:

(a) contacting a contaminated waste stream with unregenerated recovered powdered activated carbon having adsorbed/absorbed thereon a substantial quantity of organic material from a previous contact with a contaminated waste stream and activated sludge comprising cellular microorganisms for a time sufficient to biologically degrade contaminates in the waste stream, thereby producing a decontaminated waste stream and a mixture of activated sludge and microorganism encapsulated powdered activated carbon;

(b) separating by gravity the activated sludge and the microorganism encapsulated powdered activated carbon from the decontaminated wastewater;

(c) lysing substantially all of the encapsulated powdered activated carbon to remove the microorganisms encapsulating the powdered activated carbon without desorption or destruction of the adsorbed-/absorbed organic material by the following substeps, i) reacting a first portion of the microorganism encapsulated powdered activated carbon with an acidic aqueous solution;

ii) reacting a second portion of the microorganism encapsulated powdered activated carbon with an alkaline aqueous solution; and iii) combining the resultant reaction products from substeps i) and ii) to produce an admixture of unregenerated recovered powdered activated carbon and cell lysate;

(d) recycling an admixture of unregenerated recovered powdered activated carbon, activated sludge and cell lysate for recontact with contaminated wastewater, the unregenerated recovered powdered activated carbon not being subjected to a thermal regeneration process prior to recontact with the contaminated stream; and (e) periodically treating acidic cell lysate of substep i) by the substeps of, z) filtering the acidic cell lysate;

z') recycling filtered solids from substep z) for recontact with the contaminated wastewater;

z'') adjusting the pH of the acidic cell lysate to alkaline values;

z''') filtering solids from the alkaline cell lysate of substep z'');

z'''') discarding filtered solids of step z''') from the process; and z''''') recycling the alkaline cell lysate filtrate for recontact with the contaminated wastewater.

20. The process of claim 19 further comprising that the activated sludge process is selected from the group consisting of plug-flow, back mix, sequencing batch and combinations thereof.

21. The process of claim 19 further comprising that the activated sludge comprises anaerobic cellular microorganisms.

22. The process of claim 19 further comprising that the activated sludge comprises aerobic cellular microorganisms.

23. The process of claim 19 further comprising that the activated sludge comprises anoxic cellular microorganisms.

24. The process of claim 19 further comprising in that the cell lysis is performed at a temperature in the range from about 30° C. to about 150° C., for a time period of from about 1 hr to about 10 hrs, at a pressure of from about 1 to about 5 atmosphere.

* * * * *